(12) United States Patent
Yi et al.

(10) Patent No.: US 8,978,128 B2
(45) Date of Patent: Mar. 10, 2015

(54) METHOD AND APPARATUS FOR AUTHENTICATING PASSWORD OF USER TERMINAL BY USING PASSWORD ICON

(75) Inventors: Jeong Hyun Yi, Seongnam-si (KR); Gun Il Ma, Seoul (KR); Hyun Yi Yi, Incheon (KR); Si Wan Kim, Seoul (KR)

(73) Assignee: Soongsil University Research Consortium Techno-Park, Seoul (KR)

( * ) Notice: Subject to any disclaimer, the term of this patent is extended or adjusted under 35 U.S.C. 154(b) by 91 days.

(21) Appl. No.: 13/881,217

(22) PCT Filed: Dec. 23, 2011

(86) PCT No.: PCT/KR2011/010047
§ 371 (c)(1),
(2), (4) Date: Apr. 24, 2013

(87) PCT Pub. No.: WO2012/073737
PCT Pub. Date: May 23, 2013

(65) Prior Publication Data
US 2014/0201832 A1     Jul. 17, 2014

(30) Foreign Application Priority Data

Nov. 16, 2011   (KR) ........................ 10-2011-0119698

(51) Int. Cl.
| | |
|---|---|
| *G06F 7/04* | (2006.01) |
| *G06F 12/00* | (2006.01) |
| *G06F 12/14* | (2006.01) |
| *G06F 13/00* | (2006.01) |
| *G06F 21/36* | (2013.01) |
| *G06F 21/31* | (2013.01) |
| *G06F 3/0486* | (2013.01) |

(52) U.S. Cl.
CPC ................ *G06F 21/36* (2013.01); *G06F 21/31* (2013.01); *G06F 3/0486* (2013.01)
USPC .......................................................... 726/19

(58) Field of Classification Search
CPC ........ G06F 21/36; G06F 3/0486; G06F 21/31
USPC .......................................................... 726/19
See application file for complete search history.

(56) References Cited

U.S. PATENT DOCUMENTS 7,873,995 B2 *   1/2011   Bagga et al. .................... 726/19
8,306,504 B1 *   11/2012   Rincker et al. ................ 455/411

FOREIGN PATENT DOCUMENTS

| | | |
|---|---|---|
| JP | 2007-164656 | 6/2007 |
| KR | 10-2006-0031506 | 4/2006 |
| KR | 10-0986850 | 10/2010 |

* cited by examiner

*Primary Examiner* — Dant Shaifer Harriman
(74) *Attorney, Agent, or Firm* — Sherr & Jiang, PLLC

(57) ABSTRACT

Provided are method and apparatus for authenticating a password of a user terminal by using a password icon. The method includes: method of authenticating a password of a user terminal, the method including: pre-setting, by a user, a password icon corresponding to a password and a moving direction of the password icon; sequentially moving the icon according to actions of the user at a screen of the user terminal; when the icon is sequentially moved, determining whether the pre-set password icon and the pre-set moving direction of the password icon are matched; and authenticating the password when the password icon and the moving direction of the password icon is sequentially matched.

13 Claims, 6 Drawing Sheets

METHOD AND APPARATUS FOR AUTHENTICATING PASSWORD OF USER TERMINAL BY USING PASSWORD ICON

CROSS REFERENCE TO PRIOR APPLICATION

This application is a National Stage Patent Application of PCT International Patent Application No. PCT/KR2011/010047 (filed on Dec. 23, 2011) under 35 U.S.C. §371, which claims priority to Korean Patent Application No. 10-2011-0119698 (filed on Nov. 16, 2011) which are all hereby incorporated by reference in their entirety.

BACKGROUND OF THE INVENTION

1. Field of the Invention

The present invention relates to a method and apparatus for authenticating a password of a user terminal by using a password icon, and more particularly, to a password authentication technique for preventing a password from being exposed via shoulder surfing.

2. Description of the Related Art

A system including user information should only allow an access of a permitted user, and a technique for determining whether an access is attempted by a permitted legitimate user is called a user authentication. Such a user authentication is widely used for security, in login of an Internet website, Internet banking, and a user terminal. Also, according to growing supplies of user terminals, such as laptops, smart phones, and tablet PCs, authentication processes using such user terminals are frequently performed in public places.

However, a traditional user authentication using a personal identification number (PIN) input may be weak against a shoulder surfing or recording attack by a third person and a spyware/keylogger attack because a password of a user is exposed as it is during an input process. Accordingly, a method of preventing a keylogger attack by randomly arranging numbers for a password has been suggested, but the password may still be exposed via a shoulder surfing or a recording attack.

Accordingly, the inventors of the present invention studied a user authentication interface technique wherein a password is not exposed to a third person just by observing information input through a user authentication interface of a user terminal. A background technique of the present invention is disclosed in KR 10-0986850 (published on 8 Oct. 2010).

SUMMARY OF THE INVENTION

The present invention provides a password authentication technique wherein password information is protected from a third person observation as a user inputs a password in an indirect method without having to directly input the password through an interface.

According to an aspect of the present invention, there is provided a method of authenticating a password of a user terminal, the method including: pre-setting, by a user, a password icon corresponding to a password and a moving direction of the password icon; sequentially moving the icon according to actions of the user at a screen of the user terminal; when the icon is sequentially moved, determining whether the pre-set password icon and the pre-set moving direction of the password icon are matched; and authenticating the password when the password icon and the moving direction of the password icon is sequentially matched.

The pre-setting may include: selecting, by the user, the password icon from among a plurality of icons displayed on an icon window; and selecting, by the user, the moving direction of the password icon from among the plurality of moving directions displayed on an icon direction window.

The sequentially moving may include: displaying sequentially the icon at a center of the screen of the user terminal and arranging a plurality of holes along a perimeter of the screen according to the moving direction and inducing to move the icon to the hole by the user.

The method may further include, generating a fake screen on the screen of the user terminal displaying as if the icon is moving to all of the plurality of holes when a command to move the icon at the screen to the hole is input from the user.

The sequentially moving may include receiving action command of the user from any one of a keyboard, a mouse, a joystick, a touch pad, and a touch screen.

The icon may be represented in any one of a symbol, a character, a figure, a color, a hologram, an action, and a combination thereof.

The icon may include the password icon corresponding to at least one password selected by the user, and a plurality of dummy icons, wherein the password icon and the dummy icon are randomly arranged at the center of the screen.

According to another aspect of the present invention, there is provided an apparatus for authenticating a password of a user terminal, the apparatus including: a setter for pre-setting, by a user, a password icon corresponding to a password and a moving direction of the password icon; an icon mover for sequentially moving the icon according to actions of the user at a screen of the user terminal; a password determiner for, when the icon is sequentially moved, determining whether the pre-set password icon and the pre-set moving direction of the password icon are matched; and a password authenticator for authenticating the password when the password icon and the moving direction of the password icon are sequentially matched.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown. Terms used herein are selected considering functions in embodiments of the present invention, and thus meanings of the terms may differ according to users, intentions of operators, or precedents. Thus, the meanings of the terms used in the following embodiments shall follow the definitions if defined herein, otherwise shall have the same meaning as is commonly understood by one of skill in the art to which this invention belongs.

Figure 1:
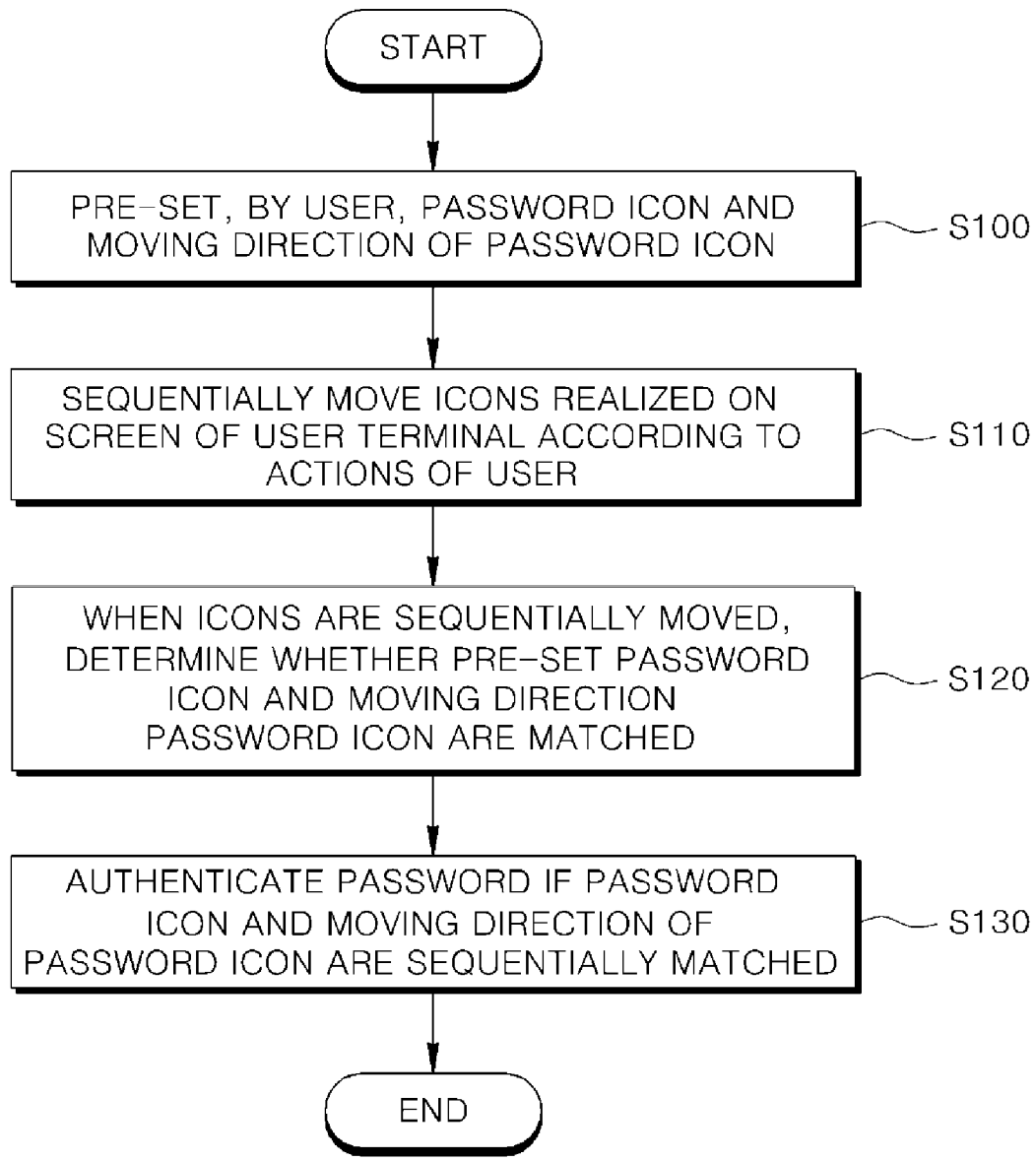
FIG. 1 is a flowchart illustrating a method of authenticating a password by using a password icon, according to an embodiment of the present invention.
Figure 2:
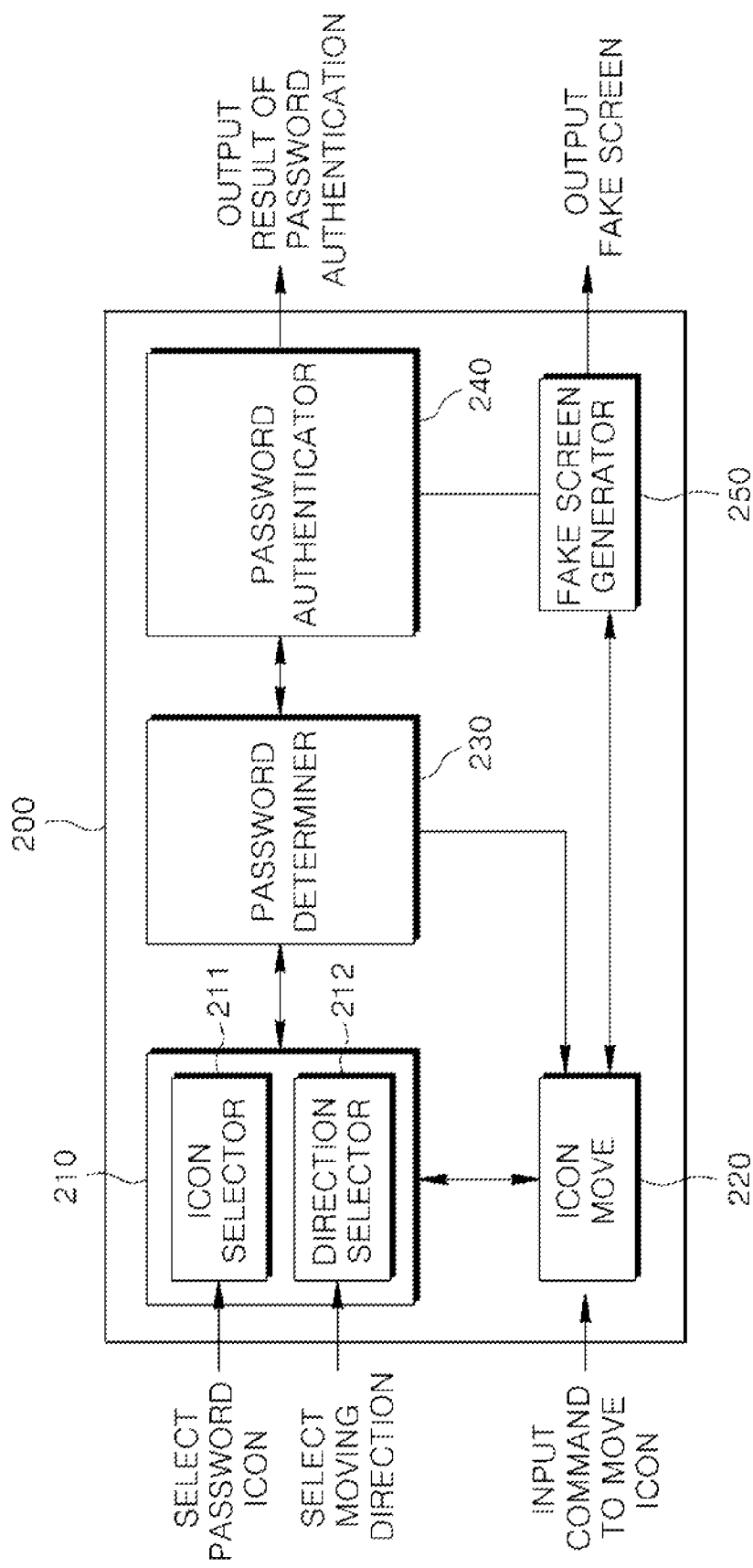
FIG. 2 is a block diagram of an apparatus for authenticating a password by using the method of FIG. 1.

FIG. 1 is a flowchart illustrating a method of authenticating a password by using a password icon, according to an embodiment of the present invention, and FIG. 2 is a block diagram of an apparatus 200 for authenticating a password by using the method of FIG. 1.

Referring to FIGS. 1 and 2, the apparatus 200 includes a setter 210, an icon mover 220, a password determiner 230, and a password authenticator 240. The setter 210 in detail includes an icon selector 211 and a direction selector 212. The icon selector 211 selects, by a user, a password icon from among a plurality of icons included in an icon window, and the direction selector 212 selects, by the user, a moving direction of the password icon from among a plurality of moving directions included in an icon direction window, in operation S100. Here, the icons are represented by any one of a symbol, a character, a figure, a color, a hologram, an action, and a combination thereof.

Also, the icons may be classified into a password icon and a dummy icon. The password icon denotes an icon selected by the user, and the dummy icon denotes an arbitrary icon that is not selected by the user but makes a third person difficult to identify the password icon during password authentication.

Hereinafter, the selecting of the password icon and the moving direction of the password icon will now be described with reference to FIG. 3.

Figure 3:
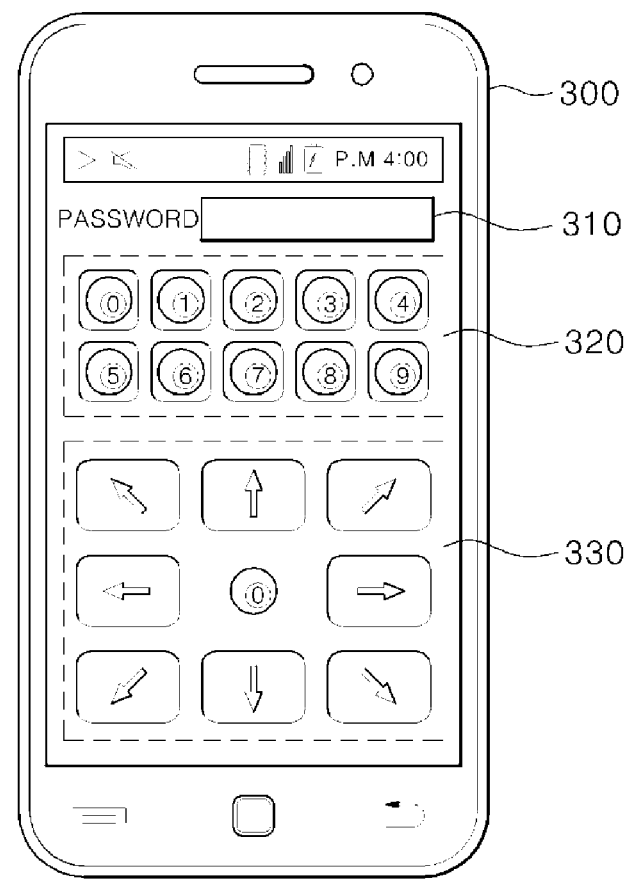
FIG. 3 is a diagram for describing selecting of a password icon and a moving direction of the password icon of the method of FIG. 1.

FIG. 3 is a diagram for describing the selecting of the password icon and the moving direction of the password icon of the method of FIG. 1.

Referring to FIG. 3, a password confirmation window 310, an icon window 320, and an icon direction window 320 are displayed on a screen of a user terminal 300. Here, examples of the user terminal 300 include fixed terminals, such as a desktop computer, an automated teller machine (ATM), a kiosk, and an equivalent terminal, and mobile terminals, such as a laptop, a tablet personal computer (PC), and a mobile phone. In the user terminal 300, an input interface and a display may be separated from each other, or may be combined with each other if a touch screen is used. The input interface may be realized as any one of a keyboard, a mouse, a joystick, a touch pad, and a touch screen.

A plurality of icons are displayed on the icon window 320. An identification character is shown in each icon, and an icon selected by a user is set as a password icon. A number of password icons used for password authentication may differ according to setting of the user. An identification character of the selected icon may be shown like '*' on the password confirmation window 310 to be prevented from being exposed to a third person. Once the user selects the password icon, direction keys are displayed on the icon direction window 330 for the user to set a direction for manipulating the password icon. For example, the direction keys may indicate up (↑), down (↓), left (←), right (→), and diagonal (↖, ↗, ↘, and ↙) directions. The user may select any one of the direction keys displayed on the icon direction window 330.

Referring back to FIGS. 1 and 2, the icon mover 220 sequentially moves the icons realized on a screen of a user terminal according to actions of the user, in operation S110. For example, the icon mover 220 displays an icon at a center of the screen of the user display and a plurality of holes according to the moving directions on a perimeter of the screen, such that the user moves the icon to one of the holes. In other words, the user may push the icon having a ball shape in the hole like a pool or golf. The password icon selected by the user and dummy icons are randomly displayed at the center of the screen of the user terminal one by one, and the user may be requested to input a moving direction for each of the password and dummy icons.

Hereinafter, the sequentially moving of the icons for password authentication will now be described in detail with reference to FIGS. 4A and 4B.

Figure 4A:
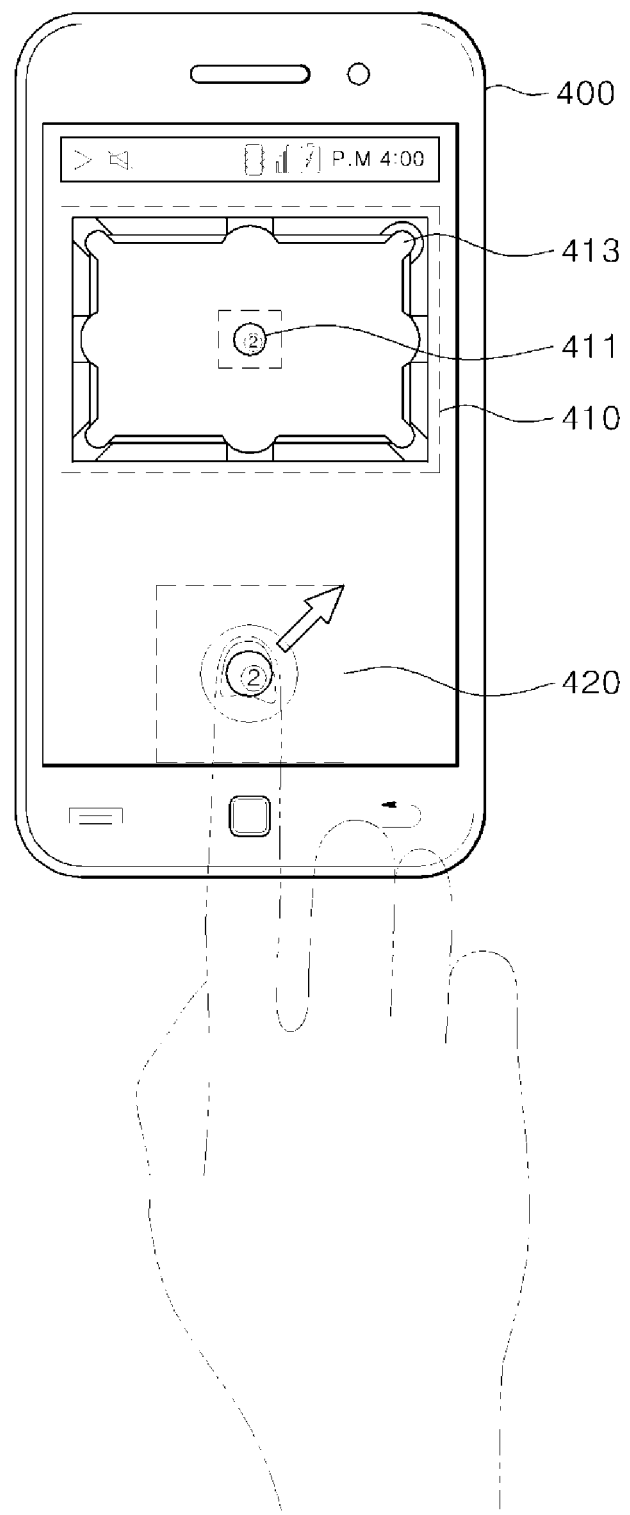
FIG. 4A is a diagram for describing using of a password icon of the method of FIG. 1.
Figure 4B:
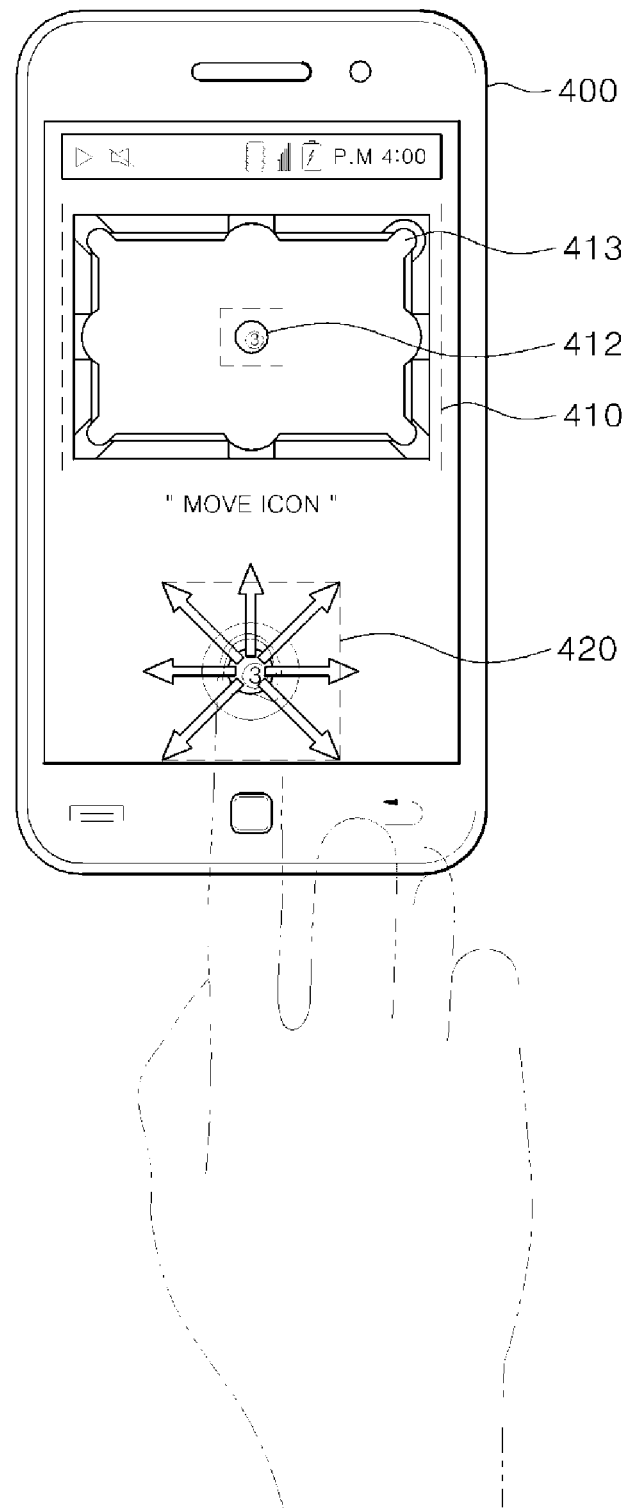
FIG. 4B is a diagram for describing using of a dummy icon of the method of FIG. 1.

FIG. 4A is a diagram for describing using of the password icon of the method of FIG. 1, and FIG. 4B is a diagram for describing using of the dummy icon of the method of FIG. 1.

Referring to FIG. 4A, when the user, for example, selected icons showing 2, 4, 5, and 8 as password icons 411, icons from 0 to 9 are sequentially displayed at a center of an icon confirmation window 410. The user may input a manipulation command to move each icon to a predetermined moving direction by using an icon manipulator 420. Here, the icon manipulator 420 may be a touch screen, a touch pad, a keyboard, or a joystick. When the password icon 411 showing 2 is displayed on the icon confirmation window 410, the user manipulates the icon manipulator 420 according to a moving direction of the password icon 411 showing 2 set by the user. For example, if the user set the moving direction of the password icon 411 showing 2 to an upper right direction (↗) the user may input a corresponding pattern to the icon manipulator 420 or input the moving direction via dragging.

Meanwhile, in the above embodiment, 2, 4, 5, and 8 are set as the password icons 411, and 0, 1, 3, 6, 7, and 9, which are remaining numerals, are set as dummy icons 412. For example, when the dummy icon 412 showing 3 is displayed at the center of the icon confirmation window 410, the user may input a manipulation command to move the dummy icon 412 to an arbitrary direction. In other words, in order to prevent a password from being exposed to a third person, the user may not only input manipulation commands to move the password icons 411 but also input manipulation commands to move the dummy icons 412. The number of dummy icons 412 may differ according to setting of the user.

Also, the dummy icons 412 may have moving directions different from moving directions set for the password icons 411. For example, when the moving directions of the four password icons 411 are respectively set to upper right (↗) lower left (↙), left (←), and up (↑) directions, the moving directions of the dummy icons 412 may be set to down (↓), right (→), upper left (↖), and lower right (↘) directions.

Accordingly, it is difficult for the third person to, firstly, identify the password icons 411, and secondly, determine the moving directions, and thus even if a process of password authentication is exposed to the third person, it is practically impossible to obtain information about the password authentication. The manipulating of the dummy icon 412 is shown in FIG. 4B.

Referring back to FIGS. 1 and 2, when the icons are sequentially moved, the password determiner 230 determines whether the password icon and the moving direction of the password icon are matched in operation S120. The password determiner 230 obtains information about the moving direction of the password icon, and compares the obtained information with information about the selected moving direction of the password icon. When the password is set by combining a plurality of password icons, information about a moving direction of each password icon is compared to determine whether it matches information about the selected moving direction of the password icon. The password determiner 230 outputs the result of determination to the password authenticator 240.

Then, the password authenticator 240 receives a password select signal of the user from the password determiner 230, and authenticates the password if the password icon corresponding to the password and the moving direction of the password icon are sequentially matched, in operation S130. Also, the password authenticator 240 outputs the result of password authentication by using a display or a speaker of a user terminal 400. For example, when the password pre-set by the user does not match the password select signal input from the password determiner 230, a password authentication failure message may be displayed on the display or a password authentication failure alarm may be generated through the speaker. Accordingly, the user may check whether the password authentication is succeeded.

Meanwhile, the apparatus 200 further includes a fake screen generator 250. A fake screen is a screen for hiding the moving direction of the password icon on the screen of the user terminal so as to prevent shoulder surfing by the third person. When the manipulation command to move the icon to the hole is input by the user, the fake screen generator 250 displays the icon as if it is moving to all holes displayed on the screen of the user terminal.

Hereinafter, the fake screen will be described in detail with reference to FIG. 5.

Figure 5:
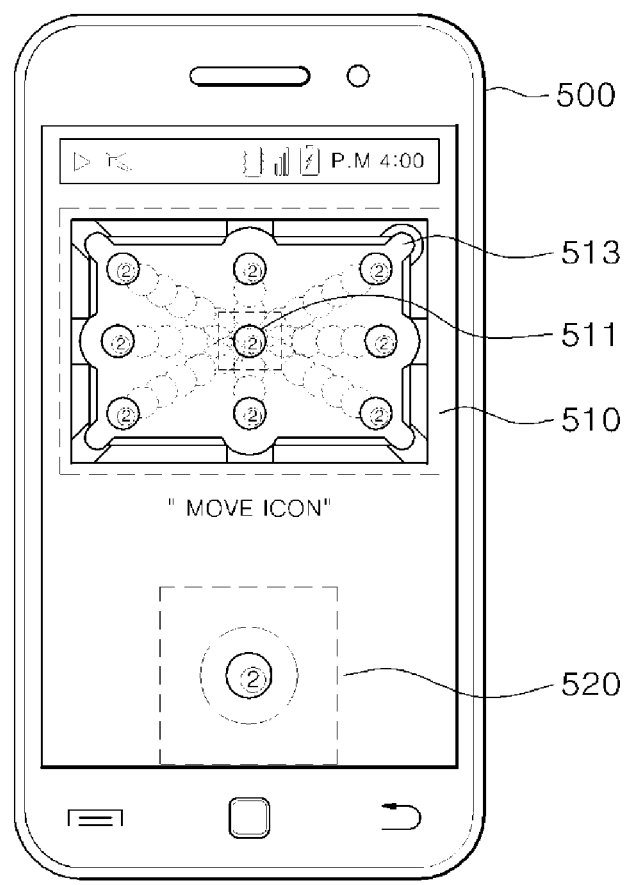
FIG. 5 is a diagram for describing generating of a fake screen while manipulating a password icon of the method of FIG. 1.

FIG. 5 is a diagram for describing generating of a fake screen while manipulating a password icon 511 of the method of FIG. 1.

Referring to FIG. 5, when the user inputs the manipulation command about a moving direction through an icon manipulator 520 while the password icon 511 is displayed on an icon confirmation window 510 of a user terminal 500, the fake screen generator 250 displays the password icon 511 as if it is moving to all holes 513. For example, when the manipulation command is input for the password icon 511 showing 2, the fake screen generator 250 displays as if the password icon 511 is moving to the nine holes 513 formed along a perimeter of the icon confirmation window 510. Accordingly, if the third person could not see the manipulation command input by the user through the icon manipulator 520, the third person is unable to obtain information about the moving direction of the password icon 511 just by looking at the icon confirmation window 510.

Also, when the manipulation command is input by the user, the fake screen generator 250 may display the icon manipulator 520 to move to a direction opposite to the moving direction. The fake screen may differ according to setting of the user. Since a time taken for the user to manipulate the icon manipulator 520 is very short to be recognized by naked eyes, and a time of displaying a moving icon in the icon confirmation window 510 is very short, the password may be prevented from being exposed to the third person.

As described above, according to one or more embodiments of the present invention, password information may be protected from a third person observation as a user inputs a pre-set password in an indirect method without having to directly input the pre-set password through an authentication interface. Also, the user may input the pre-set password easily and conveniently by adding recreational element to inputting of the pre-set password.

The invention can also be embodied as computer readable codes on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of authenticating a password of a user terminal, the method comprising:
    pre-setting, by a user, a password icon corresponding to a password and a moving direction of the password icon;
    sequentially moving the icon according to actions of the user at a screen of the user terminal;
    when the icon is sequentially moved, determining whether the pre-set password icon and the pre-set moving direction of the password icon are matched; and
    authenticating the password when the password icon and the moving direction of the password icon is sequentially matched,
    wherein the icon comprises the password icon corresponding to at least one password selected by the user, and a plurality of dummy icons, wherein the password icon and the dummy icon are randomly arranged at the center of the screen.

2. The method of claim 1, wherein the pre-setting comprises:
    selecting, by the user, the password icon from among a plurality of icons displayed on an icon window; and
    selecting, by the user, the moving direction of the password icon from among the plurality of moving directions displayed on an icon direction window.

3. The method of claim 1, wherein the sequentially moving comprises displaying sequentially the icon at a center of the screen of the user terminal and arranging the plurality of holes along a perimeter of the screen according to the moving direction and inducing to move the icon to the hole by the user.

4. The method of claim 3, further comprising:
    generating a fake screen on the screen of the user terminal by displaying the icon moving to all of the plurality of holes when a command to move the icon at the screen to the hole is input from the user.

5. The method of claim 1, wherein the sequentially moving comprises receiving action command of the user from any one of a keyboard, a mouse, a joystick, a touch pad, and a touch screen.

6. The method of claim 1, wherein the icon is represented in any one of a symbol, a character, a figure, a color, a hologram, an action, and a combination thereof.

7. An apparatus for authenticating a password of a user terminal, the apparatus comprising:
    a setter for pre-setting, by a user, a password icon corresponding to a password and a moving direction of the password icon;
    an icon mover for sequentially moving the icon according to actions of the user at a screen of the user terminal;
    a password determiner for, when the icon is sequentially moved, determining whether the pre-set password icon and the pre-set moving direction of the password icon are matched; and a password authenticator for authenticating the password when the password icon and the moving direction of the password icon are sequentially matched, wherein the icon comprises the password icon corresponding to at least one password selected by the user, and a plurality of dummy icons, wherein the password icon and the dummy icon are randomly arranged at the center of the screen.

8. The apparatus of claim 7, wherein the setter comprises:
an icon selector for selecting, by the user, the password icon from among the plurality of icons displayed on an icon window; and
a direction selector for selecting, by the user, the moving direction of the password icon from among the plurality of moving directions displayed on an icon direction window.

9. The apparatus of claim 7, wherein the icon mover is displayed sequentially the icon at a center of the screen of the user terminal and arranged a plurality of holes along a perimeter of the screen according to the moving direction and induced to move the icon to hole by the user.

10. The apparatus of claim 9, further comprising:
a fake screen generator for, when a command to move an icon at the screen to the hole, generating a fake screen on the screen of the user terminal by displaying the icon moving to all of the plurality of holes.

11. The apparatus of claim 7, wherein the icon mover is realized in any one of a keyboard, a mouse, a joystick, a touch pad, and a touch screen.

12. The apparatus of claim 7, wherein the icon is represented in any one of a symbol, a character, a figure, a color, a hologram, an action, and a combination thereof.

13. A non-transitory computer-readable medium having embodied thereon a program, which when executed by a processor of a user terminal causes the processor to perform a method comprising:
pre-setting, by a user, a password icon corresponding to a password and a moving direction of the password icon;
sequentially moving the icon according to actions of the user at a screen of the user terminal;
when the icon is sequentially moved, determining whether the pre-set password icon and the pre-set moving direction of the password icon are matched; and
authenticating the password when the password icon and the moving direction of the password icon is sequentially matched,
wherein the icon comprises the password icon corresponding to at least one password selected by the user, and a plurality of dummy icons, wherein the password icon and the dummy icon are randomly arranged at the center of the screen.

* * * * *